Patented May 22, 1923.

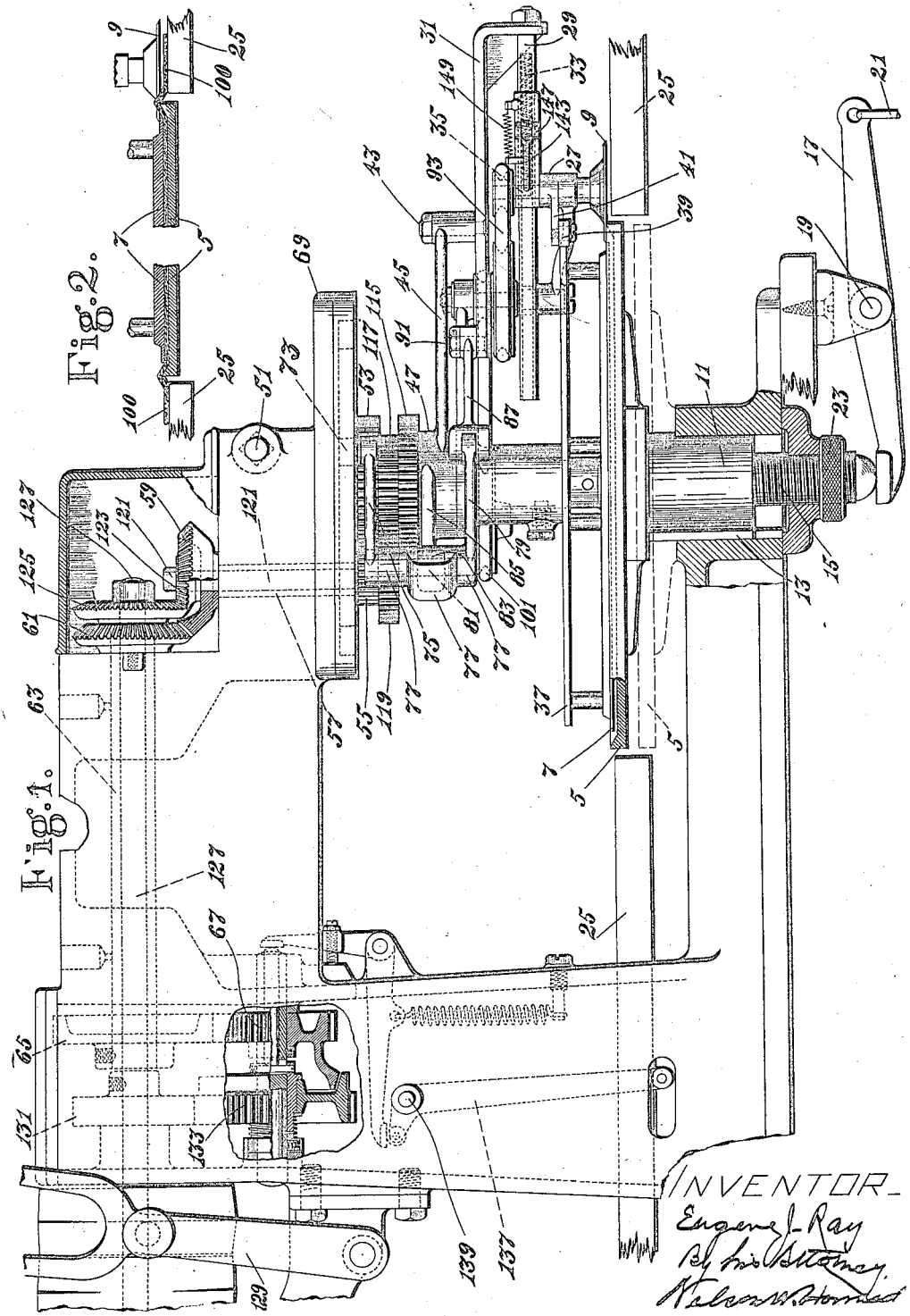

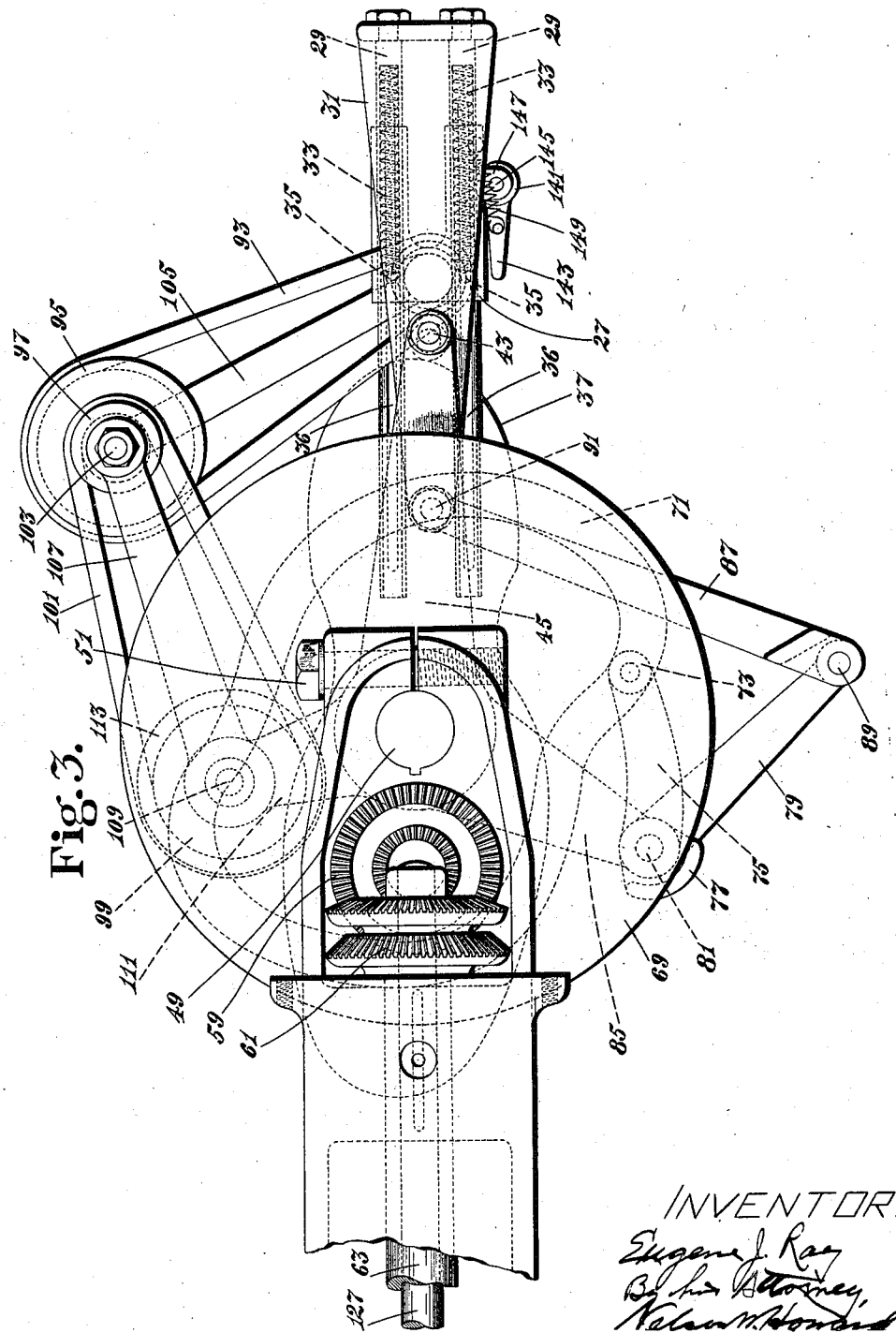

1,456,038

UNITED STATES PATENT OFFICE.

EUGENE J. RAY, OF BEVERLY, MASSACHUSETTS, ASSIGNOR TO UNITED SHOE MACHINERY CORPORATION, OF PATERSON, NEW JERSEY, A CORPORATION OF NEW JERSEY.

SOLE-CUTTING MACHINE.

Application filed November 11, 1918. Serial No. 262,106.

*To all whom it may concern:*

Be it known that I, EUGENE J. RAY, a citizen of the United States, residing at Beverly, in the county of Essex and State of Massachusetts, have invented certain Improvements in Sole-Cutting Machines, of which the following description, in connection with the accompanying drawings, is a specification, like reference characters on the drawings indicating like parts in the several figures.

This invention relates to cutting blanks from sheet material and is herein illustrated as embodied in a machine for cutting soles from sheet rubber.

Soles which are to be used in the manufacture of various kinds of rubber footwear should have beveled edges; and hitherto such beveled-edge soles have been produced by laying a sheet of rubber upon a flat surface, placing a pattern upon the sheet and drawing a knife around the pattern, the axis of the knife being inclined to produce the desired beveled edge on the sole. The results obtained by this procedure are not as accurate as is desired, particularly with regard to the bevel of the edge; and the general object of the present invention is to provide a method of and a machine for cutting from a sheet of stock a series of blanks of substantially uniform outline, the bevel of the edges of which is of the same width and inclination.

According to one feature of the invention a portion of a sheet of flexible material is clamped in a matrix with other portions of the material extending over the edge of the matrix, and then the material is severed along the line of said edge. By providing a matrix having sides which are inclined at the proper angle, a blank having its edge beveled uniformly at the desired inclination may be produced, the shape of the matrix determining the outline of the blank and the angle of bevel of its edge with great precision.

And inasmuch as the rubber stock is vulcanized at the time the blanks are cut from it and therefore difficult to sever without distortion, a rotary knife is employed whereby the resultant cut is much more even than was the case with the drag knives hitherto used.

These and other features of the invention will be described in connection with an illustrative machine by which the method may be practiced and will be pointed out in the appended claims.

Referring now to the accompanying drawings,—

Fig. 1 is an elevation of an illustrative machine;

Fig. 2 is a detail principally in cross-section, showing how the stock is clamped in the matrix and then severed; and Fig. 3 is a plan view of the machine.

Referring first to Figs. 1 and 2, the matrix is indicated at 5 and the clamp at 7. As shown in Fig. 2, when a portion of the stock has been clamped in the matrix, other portions extend over the edge of the matrix so that if the stock is severed by a cut along the upper edge of the matrix, for example by the rotary disk knife 9, in a plane substantially parallel to the flat bottom of the matrix, there will be cut from the stock a blank having the outline of the matrix and having an edge beveled at an angle which will depend upon the inclination of the upwardly sloping sides of the matrix. With this brief description of the method employed, the mechanism for clamping the stock and for causing the knife to sever it will now be described.

In the illustrative machine the clamp 7 is stationary and the matrix 5, having a flat bottom and inclined sides, is carried at the upper end of a cylindrical base 11 which is vertically slidable in a socket in the frame of the machine and is held from angular movement by a key 13. Threaded into the base 11 is a screw 15 which passes freely through a bore in the frame at the bottom of the socket, the head of the screw being engaged by one end of a lever 17, pivoted near its middle to a stationary member at 19 and connected at the end remote from the screw 15 with a treadle rod 21. A check nut 23 threaded on the screw 15 limits the upward movement of the matrix. Normally the matrix is in the position shown in dotted lines in Fig. 1 ready to have a portion of a piece of sheet material laid over it. When this has been done, depression of a treadle (not shown) raises the matrix into the full line position to cause a portion of the material to be clamped in the manner which has been described in connection with Fig. 2. It will be noted that the table 25 of the bench upon which the machine is mounted is cut out to permit the matrix, when in inoperative position, to be beneath the level of the supporting surface of the table, this construction facilitating the handling of the sheet material during the cutting out of a series of blanks, which will hereafter be referred to as soles, since the illustrative machine is designed for the production of sole blanks.

In the machine of the illustrations, a rotary disk knife is employed and is caused to move around the edge of the matrix, the plane of the knife, and consequently of the cut produced thereby, being parallel to that of the bottom of the matrix. This knife 9 is rotatable in a holder 27 which is slidable toward and from the matrix on guiding means comprising two partly hollow rods 29 which are fast to and form part of a carriage 31. Springs 33, located inside the rods, act against pins 35 which are set into the knife-holder, and tend to urge the knife holder at all times toward the matrix and at the same time to permit the holder to move outwardly when necessary. Slots 36 in the rods 29 are provided to permit the sliding of the knife holder. Co-operating with these springs is a stationary track 37 upon which runs a roll 39, said roll being rotatable on the end of an arm 41 which is rigid with the knife holder 27. The track which carries the clamp has a contour similar to but smaller than that of the clamp which in turn has an outline similar to but smaller than that of the matrix. As the carriage 31 is moved around the matrix the springs 33 hold the roll 39 at all times against the track 37 and thus maintain the edge of the knife in the position shown overlying the edge of the matrix.

The carriage 31 is pivotally supported at 43 at the outer end of an arm 45 which is integral with a hub 47, said hub being rotatable on an upright stud 49 which is held in a split bearing in an overhanging arm of the frame of the machine by a pinch-bolt 51, the clamp 7 and track 37 being fast to the lower end of said stud. The hub 47 has integral with it a gear 53 driven by a pinion 55 on the lower end of a hollow shaft 57, the upper end of the shaft carrying a bevel gear 59 which meshes with a second bevel gear 61 fast upon a hollow shaft 63. This latter shaft has fast upon it a gear 65 which is driven by a gear 67 in a manner presently to be described. With the construction thus far described it will be clear that rotation of the hollow shaft 63 will cause rotation of the hub 47 and consequently revolution of the carriage 31.

During this revolution of the carriage about the matrix the roll 39 of the knife holder 27 must be held against the track 37 and be caused to move inwardly and permitted to move outwardly by the springs 33. This inward and outward sliding movement of the knife holder will take place most readily if the direction of such movement is at all times normal to the curve of the track at the point engaged by the roll 39; and this relation can be maintained by controlling the position of the guide rods 29. In order to maintain the direction of extent of said rods at all times substantially normal to the curvature of the track, the following mechanism is provided. Located above the gear 53 is a stationary cam 69 having a track 71 to receive a roll 73 carried at the end of an arm 75 which is integral with the upper portion of a divided hub 77. The lower portion of this divided hub has integral with it an arm 79 so that the two arms 75 and 79 form in effect a bell-crank level the pivot of which is a pin 81 about which the divided hub 77 is angularly movable. This pin is carried by a hub 83 at the outer end of an arm 85 which, like the arm 45, is integral with the hub 47. A link 87 is pivoted at one end at 89 to the arm 79 and at the other end at 91 to the carriage 31. When, therefore, the carriage is moved around the track by the arm 45 it is also oscillated more or less about the pivot 43 by the linkage which has just been described, the shape of the cam 71 and the construction of the linkage being such that the direction of sliding movement of the knife holder is maintained at all times substantially normal to the curvature of the track 37. The word "normal" has been employed because the illustrative matrix is designed to produce a sole. In practice, however, different matrices are used, and portions of the edges of some of them (for example that of a tap) are straight. It should be understood therefore that the expression "normal to the curvature" as used in the appended claims is intended to cover the case in which the inward and outward movement of the knife is perpendicular to a straight portion in the edge of the matrix.

The knife is rotated by a belt 93 which passes around a small pulley fast to the upper end of the knife shaft as well as around a large pulley 95. This large pulley has integral with it a small pulley 97 around which and around a pulley 99 passes a second belt 101. The pulleys 95, 97 are rotatable on a pivot pin 103 which connects two links 105, 107 the former of which is pivoted on the knife shaft and the latter on a pin 109 carried by an arm 111 which, like the arms 45 and 85, is integral with the hub 47. The pulley 99 which is integral with a gear 113 is rotatable about the pin 109; and the gear meshes with a gear 115 which is integral with a gear 117, the two last-named gears being rotatable on a suitable bearing on the hub 47 below the gear 53. The gear 117 meshes with a gear 119 fast to the lower end of a shaft 121 located inside the hollow shaft 57, said shaft having fast upon its upper end a bevel gear 123 which meshes with a bevel gear 125 on a horizontal shaft 127. Power is applied to this shaft by means of the usual tight and loose pulleys and a belt shifter 129. As soon as power is applied to the shaft 127, the knife 9 is rotated. In order to rotate the hub 47 to cause the carriage 31 to move around the matrix, a gear 131 on the shaft 127 meshes with a gear 133. The two gears 67 and 133 are mounted in alinement and are adapted to be connected, when desired, by a clutch of any approved type which is normally inoperative but may be rendered operative by swinging a bell-crank lever 137 about its pivot 139 by means of a suitable treadle (not shown). Inasmuch as the clutch itself forms no part of the present invention and any suitable clutch may be employed, the details of its construction will not be further described. It will be noted, however, that the belt shifter 129 is first manipulated to start the rotation of the knife before the clutch is thrown in to start the movement of the knife carriage.

In the figures the edge of the knife is shown as overlying the edge of the matrix, this being the operative position. It is obvious, however, that the knife must be held away from the matrix to permit a portion of the sheet material to be laid over the matrix prior to clamping it in position. To this end an eccentric 141 having a handle 143 is pivoted at 145 between ears 147 formed on the knife holder 27 and extends through a slot in the knife holder. In the position shown the eccentric is out of contact with the adjacent rod 129, but when the handle 143 is swung around approximately 180° the eccentric contacts with the rod and holds the knife carriage immovable with respect thereto. A tension spring 149 connected at one end to a pin on the handle 143 and at the other to a pin on the knife holder 27 serves to hold the eccentric in either of its two positions.

In the operation of the machine, the matrix is permitted to descend to its dotted line position in Fig. 1 below the surface of the table 25, the knife holder 27 is pulled outwardly from the matrix and locked in this position by moving the handle 143 approximately 180°. A sheet of stock 100 is placed on the table and a portion of it placed over the matrix; the matrix is raised to clamp the stock in the manner shown in Fig. 2; the belt shifter 129 is moved to start rotation of the knife; the handle 143 is swung back into the position shown to release the knife holder; and finally the clutch between the gears 133 and 67 is thrown in to cause the hub 47 to make a complete revolution. As will be noted by an inspection of Fig. 2, the upper edge of the matrix and the upper surface of the clamp are at this time located substantially in a common horizontal plane which coincides approximately with that of the under face of the knife. The protruding stock is thus securely held and cleanly and accurately severed, the edge of the matrix and the upper face of the edge of the clamp serving as a guide and shear member for the knife.

The illustrative machine is adapted to produce soles but it should be understood that the machine will be provided with interchangeable sets of matrices, clamps, tracks and cams so that other articles, for example taps, may be produced if desired.

Having thus described my invention, what I claim as new and desire to secure by Letters Patent of the United States is:

1. A machine of the class described, having in combination, a matrix, a clamp having an outline similar to but smaller in its dimensions than that of the matrix, means for producing relative movement of approach between the clamp and the matrix to force a portion of a sheet of stock into the matrix and for holding the clamp and matrix from relative rotation, a cutter, and means for causing the stock along the entire edge of the matrix to be severed by the cutter.

2. A machine of the class described, having in combination, a matrix, means for clamping a portion of a sheet of stock in the matrix with said sheet stationary and overlying the entire edge of the matrix and exposed where it overlies said edge, a cutter, and means for causing the cutter to travel progressively around the entire edge of the matrix to sever the stock as it overlies said edge.

3. A machine of the class described, having, in combination, a matrix, a clamp for forcing a portion of the stock into the matrix, said clamp and matrix being stationary with respect to each other while the stock is being held clamped, a cutter adjacent the edge of the matrix, and means for causing relative movement of revolution between the matrix and the cutter to cut a blank from the stock.

4. A machine of the class described, having, in combination, a matrix, a clamp for forcing a portion of the stock into the matrix, a cutter adjacent the edge of the matrix, and means for revolving the cutter around the matrix to cut a blank from the stock.

5. A machine of the class described, having, in combination, a matrix having a substantially flat bottom and sloping sides, a member for clamping a portion of a piece of stock against the bottom of the matrix and immovable with respect to the member and matrix with other portions of the stock extending out over the edge of the matrix entirely around said edge, a rotary cutter extending over said edge, and means for causing the cutter to sever the stock along the entire line of said edge.

6. A machine of the class described, having in combination, a matrix having a flat bottom and sloping sides, a member for clamping a portion of a piece of stock against the bottom of the matrix, means for supporting the clamping member from a point located inside the contour of the matrix whereby the stock may overlie the entire edge of the matrix and the overlying portion of the stock be accessible to a cutter, and means for severing the stock along the edge of the matrix by a cut substantially parallel to the bottom of the matrix.

7. A machine of the class described, having, in combination, a matrix, means for clamping a portion of a piece of stock in the matrix, a rotatable cutter movable around the matrix to sever the stock, and means for first imparting rotation to the cutter and then movement of translation around the matrix.

8. A machine of the class described, having, in combination, a matrix, a clamp, means for producing relative movement of approach between the clamp and matrix to force a portion of a piece of stock into the matrix, a cutter carriage, a rotary cutter mounted thereon, means for rotating the cutter, and means for causing the carriage, and with it the cutter, to travel around the edge of the matrix.

9. A machine of the class described, having, in combination, a matrix, a clamp, means for producing relative movement of approach between the clamp and matrix to force a portion of a piece of stock into the matrix, a cutter carriage, a rotary cutter mounted thereon, means for rotating the cutter, means for causing the carriage, and with it the cutter, to travel around the edge of the matrix, and yielding means for urging the cutter into a position in which it overlies the edge of the matrix.

10. A machine of the class described, having, in combination, a matrix, a clamp having an outline similar to but smaller in all its dimensions than that of the matrix, means for causing relative movement of approach between the matrix and the clamp to force a portion of a sheet of stock into the matrix and to bring the upper surface of the margin of the clamp substantially into the plane of the upper edge of the matrix, a cutter located to overlie said margin and edge, and means for moving the cutter along the edge of the matrix to sever the stock.

11. A machine of the class described, having in combination, a matrix having a substantially flat bottom and sloping sides, a clamp having an outline similar to but smaller in all its dimensions than that of the matrix, means for causing relative movement of approach between the matrix and the clamp to force a portion of a sheet of stock into the matrix and to bring the upper surface of the margin of the clamp substantially into the plane of the upper edge of the matrix, a cutter located to overlie said margin and edge, and means for moving the cutter along the edge of the matrix to sever the stock.

12. A machine of the class described, having, in combination, a matrix, means for forcing a portion of a piece of stock into the matrix, a track adjacent the matrix having an outline similar to that of the matrix, a carriage, a cutter-holder mounted in the carriage, a member carried by the holder and adapted to engage the track, said holder being movable with respect to the carriage toward and from the track, a cutter mounted in the holder, means for revolving the carriage around the matrix, and yielding means for holding the track-engaging member in contact with the track during the movement of revolution.

13. A machine of the class described, having in combination, a matrix, means for clamping a portion of a piece of stock in the matrix in such manner that the piece is held immovable with respect to the matrix, a cutter carriage, means for producing relative movement of revolution between the cutter carriage and the matrix, and a cutter mounted in the cutter carriage and adjustable into and out of operative position with respect to the matrix.

14. A machine of the class described, having, in combination, a matrix, means for forcing a portion of a piece of stock into the matrix, a cutter-carriage, a cutter mounted on the carriage and slidably toward and from the matrix, guiding means for determining the direction of the sliding movement, and means for causing the edge of the matrix to be traversed by the cutter and for maintaining the guiding means at all times approximately normal to the curvature of the edge of the matrix.

15. A machine of the class described, having, in combination, a matrix, a carriage movable around the matrix, and capable of oscillation, a cutter mounted on the carriage, and means for moving the carriage around the matrix, for oscillating the carriage, and for rotating the cutter.

16. A machine of the class described, having, in combination, a matrix, a carriage movable around the matrix and capable of oscillation, a cutter mounted on the carriage, and means for moving the carriage around the matrix for oscillating the carriage and for rotating the cutter, said means comprising a rotary driving member having three arms, connections between two of the arms and the carriage and connections between the third arm and the knife.

17. A machine of the class described, having, in combination, a matrix, means for forcing a portion of a piece of stock into the matrix, a rotary driving member, an arm on said member, a carriage pivotally supported on said arm, a cutter mounted on said carriage, a second arm on said member, means connected with said second arm for oscillating the carriage on its pivot, a third arm on said member, and means connected with said third arm for rotating said cutter.

18. A machine of the class described, having in combination, a matrix, a clamping member, means for producing relative movement of approach between the member and matrix and for holding them stationary with respect to each other, a cutter, and means for causing relative movement of revolution between the matrix and cutter.

19. A machine of the class described, having in combination, a matrix, a clamp for forcing a portion of the stock into the matrix, means for holding the clamp and matrix from relative rotation, a cutter adjacent to the edge of the matrix, and means for causing relative movement of revolution between the matrix and cutter in a path the plane of which is substantially parallel to the plane of the edge of the matrix.

20. A machine of the class described, having in combination, a table upon which a sheet of stock may be laid, said table having an opening therein, separable clamping members including a matrix, one of said members being movable in the opening, means for producing relative movement of approach between the members to clamp a portion of the stock immovably in the matrix with other portions of the stock overlying an edge of the matrix and exposed along said edge, and means for severing the stock along said edge.

21. A machine for cutting from a sheet of rubber a series of blanks provided with beveled edges, having in combination, a stationary, substantially flat-faced table for supporting the sheet, said table having an opening therein, separable clamping members including a matrix, one of said members being movable through the opening toward the other member, means for producing relative movement of approach between the members to clamp a portion of the sheet immovably in the matrix with the sheet as a whole still supported on the table so that portions of the sheet overlie the edge of the matrix, and means for severing the sheet along said edge.

In testimony whereof I have signed my name to this specification.

EUGENE J. RAY.